US007089409B2

(12) United States Patent
Merchant et al.

(10) Patent No.: US 7,089,409 B2
(45) Date of Patent: *Aug. 8, 2006

(54) INTERFACE TO A MEMORY SYSTEM FOR A PROCESSOR HAVING A REPLAY SYSTEM

(75) Inventors: Amit A. Merchant, Portland, OR (US); Darrell D. Boggs, Aloha, OR (US); David J. Sager, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 40 days.

This patent is subject to a terminal disclaimer.

(21) Appl. No.: 10/690,634

(22) Filed: Oct. 23, 2003

(65) Prior Publication Data

US 2004/0083351 A1  Apr. 29, 2004

Related U.S. Application Data

(63) Continuation of application No. 09/475,029, filed on Dec. 30, 1999, now Pat. No. 6,665,792, which is a continuation-in-part of application No. 09/106,857, filed on Jun. 30, 1998, now Pat. No. 6,163,838, which is a continuation-in-part of application No. 08/746,547, filed on Nov. 13, 1996, now Pat. No. 5,966,544.

(51) Int. Cl.
*G06F 9/48* (2006.01)
(52) U.S. Cl. ..................... 712/244; 712/219
(58) Field of Classification Search ................ 712/244, 712/219, 216, 225, 32; 711/169
See application file for complete search history.

(56) References Cited

U.S. PATENT DOCUMENTS 5,012,403 A * 4/1991 Keller et al. ................. 712/228
5,421,022 A * 5/1995 McKeen et al. ............... 712/23
5,619,662 A * 4/1997 Steely et al. ................. 712/216

* cited by examiner

Primary Examiner—Henry W. H. Tsai
(74) Attorney, Agent, or Firm—Kenyon & Kenyon LLP

(57) ABSTRACT

A processor includes a memory execution unit for executing load and store instructions and a replay system for replaying instructions which have not executed properly. The memory execution unit including an invalid store flag that is set for a store instruction if the replay system detects that the store instruction has not executed properly and is cleared if the store instruction has executed properly. If an invalid store flag is set for a store instruction, the replay system replays load instructions which are programmatically younger than the invalid store instruction until the store instruction executes properly.

25 Claims, 6 Drawing Sheets

|   | Operation | Source | Destination |
|---|-----------|--------|-------------|
| 1) | Store | R4, | [R1] |
| 2) | Load | [X], | R2 |

| Reg. | Correct Value | Incorrect Value |
|------|---------------|-----------------|
| R1 | X | Y |

*Figure 4a*

L0 Cache System 120

| Address | Data |
|---------|------|
| X | F000 |
|   |   |

INTERFACE TO A MEMORY SYSTEM FOR A PROCESSOR HAVING A REPLAY SYSTEM

CROSS-REFERENCE TO RELATED APPLICATIONS

This application is a continuation of U.S. patent application Ser. No. 09/475,029 filed Dec. 30, 1999 (now U.S. Pat. No. 6,665,792) which is a continuation-in-part of U.S. patent application Ser. No. 09/106,857, filed Jun. 30, 1998 now U.S. Pat. No. 6,163,838 and entitled "Computer Processor With a Replay System" which is a continuation-in-part of application Ser. No. 08/746,547 filed Nov. 13, 1996 now U.S. Pat. No. 5,966,544 and entitled "Processor Having a Replay Architecture."

FIELD

The present invention is directed to a processor. More particularly, the present invention is directed to an interface to a memory system for a processor having a replay system.

BACKGROUND

The primary function of some processors is to execute computer instructions. Most processors execute instructions in the programmed order that they are received. However, some recent processors, such as the Pentium® II processor from Intel Corp., are "out-of-order" processors.

An out-of-order processor can execute instructions in any order as the data and execution units required for each instruction becomes available. Some instructions in a computer system are dependent on one another because of their reference to particular registers (known as source dependency or register data dependency). Out-of-order processors attempt to exploit parallelism by actively looking for instructions whose input sources are available for computation, and scheduling them ahead of programmatically later instructions. This creates an opportunity for more efficient usage of machine resources and overall faster execution.

An out-of-order processor can also increase performance by reducing overall latency. This can be done by speculatively scheduling instructions while assuming that the memory subsystem used by the processor provides the correct data when the instruction is executed, as performed in the above-referenced parent application. However, several types of dependencies between instructions may inhibit the proper speculative execution of instructions. These dependencies may include register or source dependencies and memory dependencies. Addressing these dependencies increases the likelihood that a processor will correctly execute instructions.

Therefore, there is a need for a technique to adequately address the different types of dependencies that may prevent the proper execution of instructions in a processor.

SUMMARY

According to an embodiment of the present invention, a computer processor is provided that includes a replay system for determining which instructions have not executed properly and replaying those instructions which have not executed properly. The processor also includes a memory execution unit coupled to the replay system for executing load and store instructions. The memory execution unit includes an invalid store flag that is set for a store instruction if the replay system detects that the store instruction has not executed properly and is cleared if the store instruction has executed properly. If an invalid store flag is set for a store instruction, the replay system replays load instructions which are programmatically younger than the invalid store instruction so long as the invalid store flag is set.

BRIEF DESCRIPTION OF THE DRAWINGS

The foregoing and a better understanding of the present invention will become apparent from the following detailed description of exemplary embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and is not limited thereto. The spirit and scope of the present invention being limited only by the terms of the appended claims.

The following represents brief descriptions of the drawings, wherein:

FIGS. 4a–b are diagrams illustrating an example memory dependency according to an embodiment of the present invention.

DETAILED DESCRIPTION

I. Introduction

Figure 1:
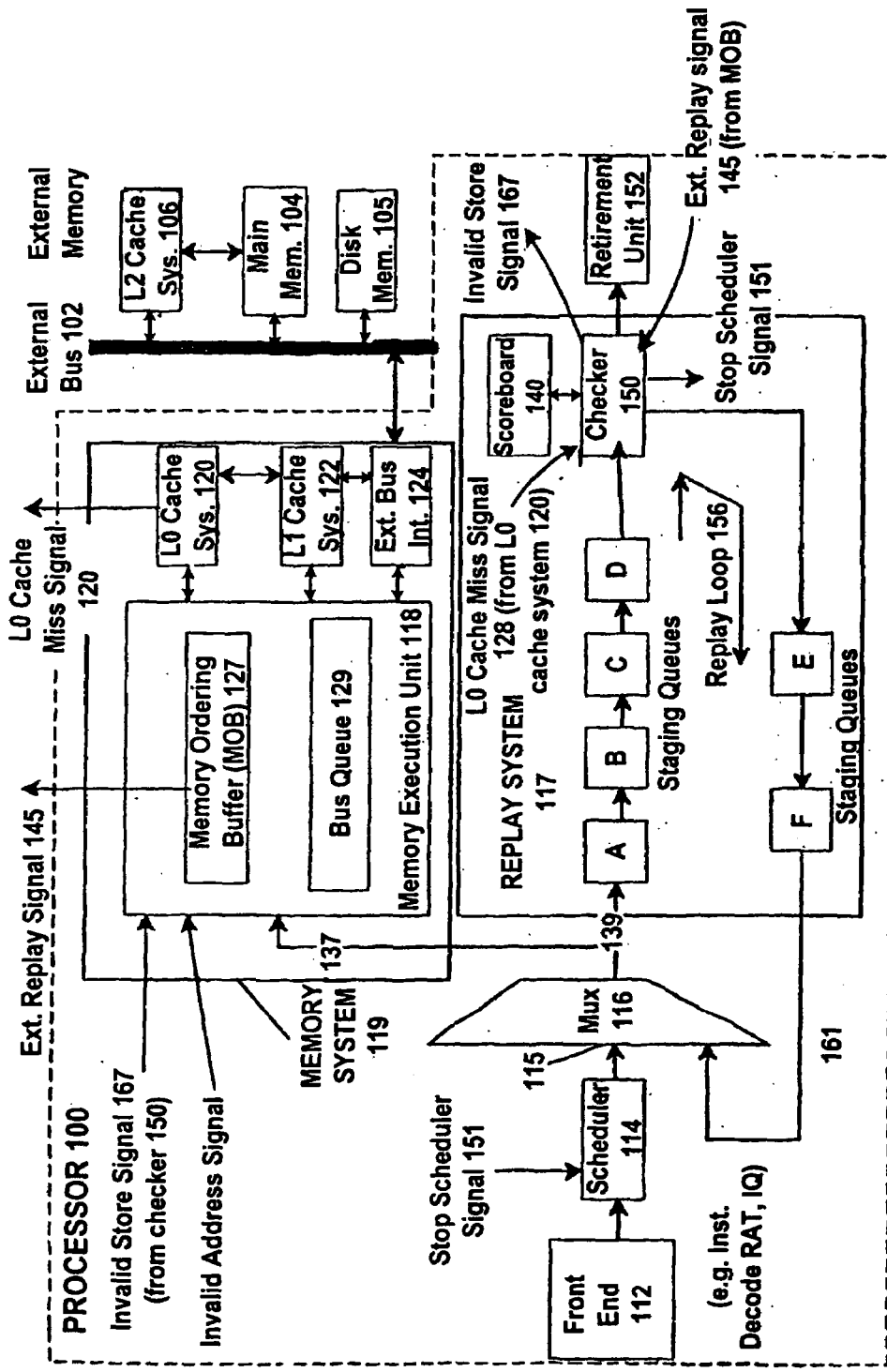
FIG. 1 is a block diagram illustrating a computer system that includes a processor according to an embodiment of the present invention.

U.S. patent application Ser. No. 09/106,857, filed Jun. 30, 1998 and entitled "Computer Processor With a Replay System" ("the '857 application") discloses a processor in which latency is reduced by speculatively scheduling instructions for execution. In the '857 application, a replay system is disclosed for replaying or re-executing those instructions which executed improperly. As noted in the '857 application, an instruction may execute improperly for many reasons. The most common reasons are a source (or register) dependency and an external replay condition (such as a local cache miss). A source dependency can occur when a source of a current instruction is dependent on the result of another instruction.

The source dependencies addressed in the '857 application primarily relate to register dependencies which can be tracked by the replay system. However, the '857 application does not specifically account for the problem of hidden memory dependencies. Memory dependencies are dependencies that occur through the memory and cannot be easily detected. As an example, a memory load operation may be dependent upon a previous memory store operation (i.e., the load reads from same memory location to which the store writes). In such a case, if the earlier store operation executes improperly, the dependent load operation should also be replayed. A problem is that the subsequent load may not be replayed if the hidden memory dependency goes undetected. This failure to replay the load instruction can create several problems, including an error in the load operation due to incorrect data, a waste of valuable external bus resources due to a possible erroneous memory read request to retrieve the data across an external bus if there is a local cache miss, and pollution of the on-chip or local cache systems with bad or erroneous data.

According to an embodiment of the present invention, an interface is provided between a memory system and a replay system for accounting for hidden memory dependencies. The memory system includes a memory execution unit, an L0 cache system, a L1 cache system (for example) and an external bus interface. The replay system includes a checker for checking whether or not an instruction has executed properly. If the instruction has not executed properly, the instruction is returned to the execution unit for replay or re-execution. According to an embodiment, the memory execution unit includes a memory ordering buffer (MOB) including a store buffer and a load buffer for maintaining ordering of load and store operations. The memory execution unit also includes a bus queue for issuing and tracking memory requests which are sent to an external bus, for example, when the data is not found on the local cache systems (L0 cache or L1 cache).

According to an embodiment of the invention, if the checker determines that a store operation has been incorrectly executed, the checker generates an invalid store signal to the MOB and the bus queue. In response to the invalid store signal, the MOB sets an invalid store flag in the store buffer for the store instruction, which causes all subsequent loads to be replayed. Once the invalid store flag for a store operation is set in the store buffer, the MOB generates an external replay signal to the checker for each subsequent load operation that is executed, which causes the subsequent load operations to be replayed. Once the store operation executes properly, the invalid store flag is cleared and the MOB no longer issues the external replay condition for subsequent loads, thereby allowing the subsequent loads to be retired.

In addition, the invalid store signal from the checker causes the bus queue to set an inhibit load flag. When the inhibit load flag is set, the bus queue inhibits or rejects all memory requests for subsequent load operations to avoid wasting valuable external bus bandwidth on the erroneous requests for the loads. When the store operation is correctly executed, the inhibit load flag in the bus queue is cleared to allow the bus queue to issue memory requests to the external bus for the subsequent load operations.

II. Overall System Architecture

FIG. 1 is a block diagram illustrating a computer system that includes a processor according to an embodiment of the present invention. The processor 100 includes a Front End 112, which may include several units, such as an instruction decoder for decoding instructions (e.g., for decoding complex instructions into one or more micro-operations or uops), a Register Alias Table (RAT) for mapping logical registers to physical registers for source operands and the destination, and an instruction queue (IQ) for temporarily storing instructions. In one embodiment, the instructions stored in the instruction queue are micro-operations or uops, but other types of instructions can be used. The Front End 112 may include different or even additional units. According to an embodiment of the invention, each instruction includes two logical sources and one logical destination. The sources and destination are logical registers within the processor 100. The RAT within the Front End 112 may map logical sources and destinations to physical sources and destinations, respectively.

Front End 112 is coupled to a scheduler 114. Scheduler 114 dispatches instructions received from the processor Front End 112 (e.g., from the instruction queue of the Front End 112) when the resources are available to execute the instructions. Normally, scheduler 114 sends out a continuous stream of instructions. However, scheduler 114 is able to detect, by itself or by receiving a signal, when an instruction should not be dispatched. When scheduler 114 detects this, it does not dispatch an instruction in the next clock cycle. When an instruction is not dispatched, a "hole" is formed in the instruction stream from the scheduler 114, and another device can insert an instruction in the hole. The instructions are dispatched from scheduler 114 speculatively. Therefore, scheduler 114 can dispatch an instruction without first determining whether data needed by the instruction is valid or available.

Scheduler 114 outputs the instructions to a dispatch multiplexer (mux) 116. The output of mux 116 includes two parallel paths, including an execution path (beginning at line 137) that is connected to a memory system 119 (including execution unit 118 and local caches) for execution, and a replay path (beginning at line 139) that is connected to a replay system 117. The execution path will be briefly described first, while the replay path will be described below in connection with a description of the replay system 117.

As shown in FIG. 1, processor 100 includes a memory system 119. The memory system 119 includes a memory execution unit 118, a L0 cache system 120, a L1 cache system 122 and an external bus interface 124. Execution unit 118 is a memory execution unit that is responsible for performing memory loads (loading data read from memory or cache into a register) and stores (data writes from a register to memory or cache).

Execution unit 118 is coupled to multiple levels of memory devices that store data. First, execution unit 118 is directly coupled to L0 cache system 120, which may also be referred to as a data cache. As described herein, the term "cache system" includes all cache related components, including cache memory, and cache TAG memory and hit/miss logic that determines whether requested data is found in the cache memory. L0 cache system 120 is the fastest memory device coupled to execution unit 118. In one embodiment, L0 cache system 120 is located on the same semiconductor die as execution unit 118, and data can be retrieved, for example, in approximately 4 clock cycles.

If data requested by execution unit 118 is not found in L0 cache system 120, execution unit 118 will attempt to retrieve the data from additional levels of memory. After the L0 cache system 120, the next level of memory devices is L1 cache system 122. Accessing L1 cache system 122 is typically 4–16 times as slow as accessing L0 cache system 120. In one embodiment, L1 cache system 122 is located on the same processor chip as execution unit 118, and data can be retrieved in approximately 24 clock cycles, for example.

If the data is not found in L1 cache system 122, execution unit 118 is forced to retrieve the data from the next level memory device, which is an external memory device coupled to an external bus 102. Example external memory devices connected to external bus 102 include a L2 cache system 106, main memory 104 and disk memory 105. An external bus interface 124 is coupled between execution unit 118 and external bus 102; Execution unit 118 may access any external memory devices connected to external bus 102 via external bus interface 124. The next level of memory device after L1 cache system 122 is an L2 cache system 106. Access to L2 cache system 106 is typically 4–16 times as slow as access to L1 cache system 122. In one embodiment, data can be retrieved from L2 cache system 106 in approximately 200 clock cycles.

After L2 cache system 106, the next level of memory device is main memory 104, which typically comprises dynamic random access memory ("DRAM"), and then disk memory 105 (e.g., a magnetic hard disk drive). Access to main memory 104 and disk memory 105 is substantially slower than access to L2 cache system 106. In one embodiment (not shown), the computer system includes one external bus dedicated to L2 cache system 106, and another external bus used by all other external memory devices. In other embodiments of the present invention, processor 100 can include greater or less levels of memory devices than shown in FIG. 1. Disk memory 105, main memory 104 and L2 cache system 106 may be considered external memory because they are coupled to the processor 100 via external bus 102.

When attempting to load data to a register from memory, execution unit 118 first attempts to load the data from the first and fastest level of memory devices (i.e., L0 cache system 120), the second fastest level (i.e., L1 cache system 122) and so on. Of course, the memory load takes an increasingly longer time as an additional memory level is required to be accessed. When the data is finally found, the data retrieved by execution unit 118 is also stored in the lower levels of memory devices for future use.

For example, assume that a memory load instruction requires "data-1" to be loaded into a register. Execution unit 118 will first attempt to retrieve data-1 from L0 cache system 120. If it is not found there, execution unit 18 will next attempt to retrieve data-1 from L1 cache system 122. If it is not found there, execution unit 118 will next attempt to retrieve data-1 from L2 cache system 106. If data-1 is retrieved from L2 cache system 106, data-1 will then be stored in L1 cache system 122 and L0 cache system 120 in addition to being retrieved by execution unit 118.

A. General Description of Memory Execution Unit 118

As shown in FIG. 1, the memory execution unit 118 includes a memory ordering buffer (MOB) 127 and a bus queue 129. MOB 127 ensures proper ordering of all memory load and store operations (instructions). The MOB 127 includes temporary storage for the address, data and other control information for each memory load and store instruction until the store or load instruction is retired or completed. The process of retiring a store operation includes actually storing of the data in memory/cache since the memory/cache is the architectural state of the processor.

Bus queue 129 receives memory requests from L1 cache system 122 and sends the requests to the external bus 102 via the external bus interface 124 in order to read from and write to external memory devices as requested. As an example, the bus queue 129 receives a memory read request from the L1 cache system 122 when there is a cache miss on both the L0 cache system 120 and L1 cache system 122. In response to the memory read request from the L1 cache system 122, the bus queue 129 then issues a memory read request via external bus interface 124 to external bus 102 in order to retrieve the requested data from an external memory device. The bus queue 129 also issues memory write requests to external bus 102 to write data to an external memory device upon request from L1 cache system 122. The bus queue 129 tracks the memory requests by waiting to receive the requested data (for a memory read request) or a reply (for a memory write request). The bus queue 129 then sends the retrieved data (for a load operation) or a write reply (for a store operation) to the local cache systems (120 and 122).

Figure 2:
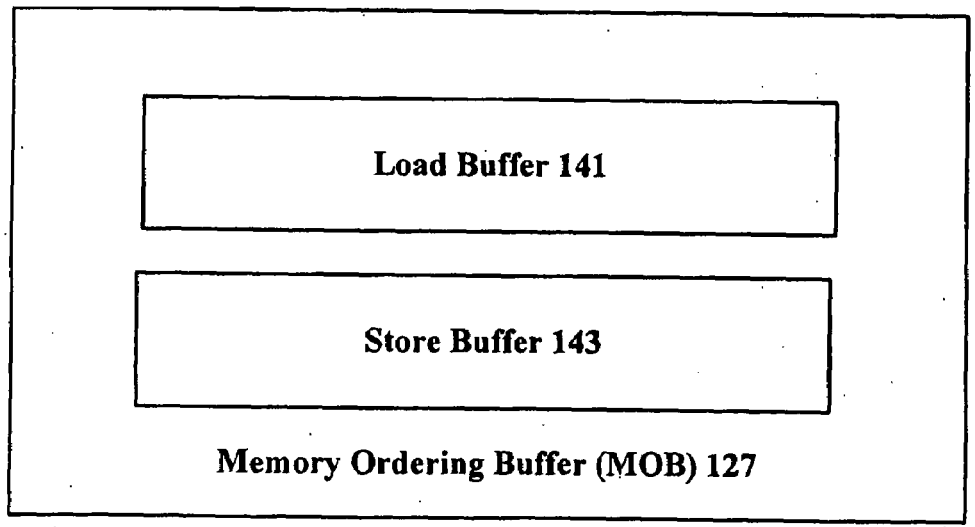
FIG. 2 is a block diagram of a memory ordering buffer (MOB) according to an example embodiment of the present invention.

FIG. 2 is a block diagram of a memory ordering buffer (MOB) according to an example embodiment of the present invention. The MOB 127 keeps track of each load or store operation as they occur, typically out of order. As shown in FIG. 2, MOB 127 includes a load buffer 141 for recording all load operations and a store buffer 143 for recording all store operations. The load buffer 141 stores address and control information (e.g., including an instruction sequence number and data size) for each outstanding (i.e., unretired) load operation. The store buffer 143 stores data, address and control information (including an instruction sequence number) for each outstanding (uncompleted) store operation.

As noted above, the two types of memory accesses are loads (memory/cache read) and stores (memory/cache write). According to an embodiment, loads only need to specify the memory address to be accessed, the width of the data being retrieved, and the destination register. Stores need to provide a memory address, a data width, and the data to be written. According to an embodiment of the invention, stores are performed in two stages. The first stage is called execution and includes storing the address of the store, the data to be stored and control information (e.g., sequence number of the store operation and data size) in the store buffer. This first stage may be performed out of program order. The second stage is called senior store completion. In this second stage, the contents of the store buffer are used to write the store to the cache systems. Senior store completion is not done speculatively or out of order, but is done only at the time of retirement. This is because the cache and memory are part of the architectural state of the processor. The store buffer 143 dispatches or performs a senior store completion only when the store has both its address and its data, and there are no older stores awaiting senior store completion (stores are not re-ordered among themselves at senior store completion).

Figure 3A:
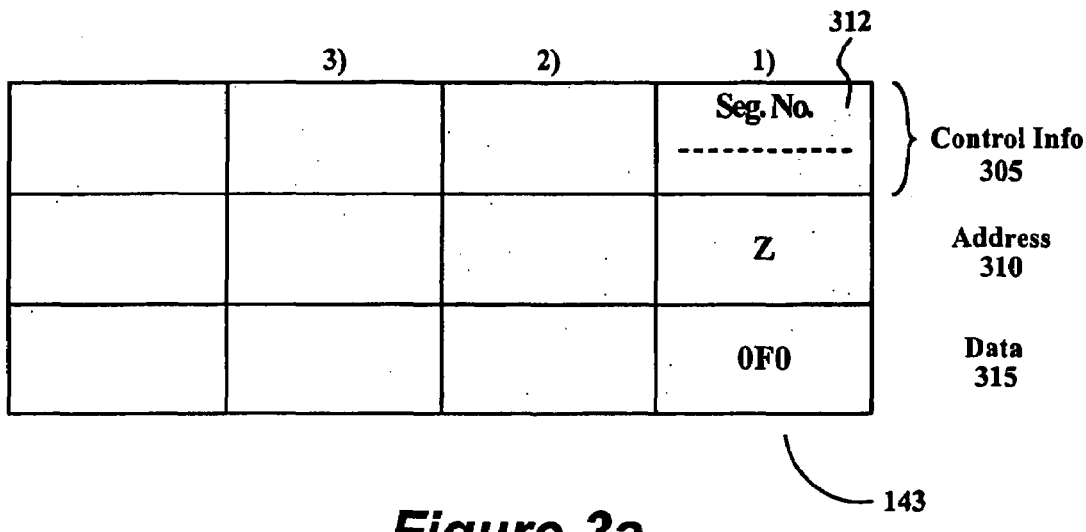
FIGS. 3a–b are block diagrams illustrating a store buffer and a load buffer according to example embodiment of the present invention.
Figure 3B:
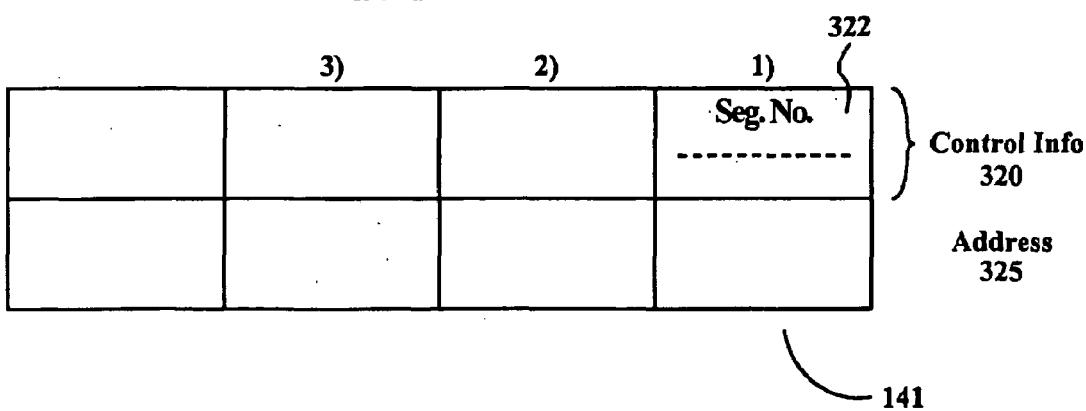

FIG. 3 is a block diagram illustrating a store buffer and a load buffer according to an example embodiment of the present invention. Referring to FIG. 3, a store buffer 143 is shown and includes control information 305, an address 310 and data 315 for each store operation (store operations 1, 2, 3, etc.). Similarly, a load buffer 141 is shown in FIG. 3, and includes control information 320 and an address for each load operation. In FIG. 3, the control information (fields 305 and 320) may include, for example, an instruction sequence number and a data width or data size for the operation.

B. General Description of a Replay System

Referring to FIG. 1 again, processor 100 further includes a replay system 117. Replay system 117, like execution unit 118, receives instructions output by dispatch multiplexer 116. Execution unit 118 receives instructions from mux 116 over line 137, while replay system 117 receives instructions over line 139. As noted above, according to an embodiment of the invention, some instructions can be speculatively scheduled for execution before the correct source data for them is available (e.g., with the expectation that the data will be available in many instances after scheduling and before execution). Therefore, it is possible, for example, that the correct source data was not yet available at execution time, causing the instruction to execute improperly. In such case, the instruction will need to be re-executed (or replayed) with the correct data. Replay system 117 detects those instructions that were not executed properly when they were initially dispatched by scheduler 114 and routes them back again to the execution unit (e.g., back to the memory execution unit 118) for replay or re-execution.

Replay system 117 includes two staging sections. One staging section includes a plurality of staging queues A, B, C and D, while a second staging section is provided as staging queues E and F. Staging queues delay instructions for a fixed number of clock cycles. In one embodiment, staging queues A–F each comprise one or more latches. The number of stages can vary based on the amount of staging or delay desired in each execution channel. Therefore, a copy of each dispatched instruction is staged through staging queues A–D in parallel to being staged through execution unit 118. In this manner, a copy of the instruction is maintained in the staging queues A–D and is provided to a checker 150, described below. This copy of the instruction may then be routed back to mux 116 for re-execution or "replay" if the instruction did not execute properly.

Replay system 117 further includes a checker 150. Generally, checker 150 receives instructions output from staging queue D and then determines which instructions have executed properly and which have not. If the instruction has executed properly, the checker 150 declares the instruction "replay safe" and the instruction is forwarded to retirement unit 152 where instructions are retired in program order. Retiring instructions is beneficial to processor 100 because it frees up processor resources, thus allowing additional instructions to begin execution.

An instruction may execute improperly for many reasons. The most common reasons are a source (or data register) dependency and an external replay condition. A source dependency can occur when a source of a current instruction is dependent on the result of another instruction. This data dependency can cause the current instruction to execute improperly if the correct data for the source is not available at execution time. Source dependencies are related to the registers.

A scoreboard 140 is coupled to the checker 150. Scoreboard 140 tracks the readiness of sources. Scoreboard 140 keeps track of whether the source data was valid or correct prior to instruction execution. After the instruction has been executed, checker 150 can read or query the scoreboard 140 to determine whether data sources were not correct. If the sources were not correct at execution time, this indicates that the instruction did not execute properly (due to a register data dependency), and the instruction should therefore be replayed. Instructions may need to be replayed due to the occurrence of any of a variety of other conditions that may cause an instruction to improperly execute.

Examples of an external replay condition may include a local cache miss (e.g., source data was not found in L0 cache system 120 at execution time), incorrect forwarding of data (e.g., from a store buffer to a load), hidden memory dependencies, a write back conflict, an unknown data/address, and serializing instructions. The L0 cache system 120 generates a L0 cache miss signal 128 to checker 150 if there was a cache miss to L0 cache system 120 (which indicates that the source data for the instruction was not found in L0 cache system 120). Other signals can similarly be generated to checker 150 to indicate the occurrence of other external replay conditions. In this manner, checker 150 can determine whether each instruction has executed properly or not. If the checker 150 determines that the instruction has not executed properly, the instruction will then be returned to multiplexer 116 via replay loop 156 to be replayed (i.e., to be re-executed at execution unit 118). Instructions routed via the replay loop 156 are coupled to mux 116 via line 161.

Although not shown in FIG. 1, instructions which did not execute properly can alternatively be routed to a replay queue for temporary storage before being output to mux 116 for replay. The replay queue can be used to store certain long latency instructions (for example) and their dependent instructions until the long latency instruction is ready for execution. One example of a long latency instruction is a load instruction where the data must be retrieved from external memory (i.e., where there is a L1 cache miss). When the data returns from external memory (e.g., from L2 cache system 106 or main memory 104), the instructions in the replay queue are then unloaded to mux 116 for replay.

In conjunction with sending a replayed instruction to mux 116, checker 150 sends a "stop scheduler" signal 151 to scheduler 114. According to an embodiment of the invention, stop scheduler signal 151 is sent to scheduler 114 in advance of the replayed instruction reaching the mux 116. In one embodiment, stop scheduler signal 151 instructs the scheduler 114 not to schedule an instruction on the next clock cycle. This creates an open slot or "hole" in the instruction stream output from mux 116 in which a replayed instruction can be inserted.

III. Hidden Memory Dependencies

As noted above, an instruction may execute improperly for many reasons. The most common reasons are a source dependency and an external replay condition. The source dependency described above is a register dependency where a source for a current instruction is provided in a register, and is dependent on the result of another instruction. This register data dependency can cause the current instruction to execute improperly if the correct data for the source is not available at execution time. At compile time and/or schedule time, the scoreboard 140 can compare the register numbers used for sources and destinations in the instructions to identify register data dependencies. Thus, the scoreboard 140 is able to identify those instructions which executed improperly due to a register data dependency, which allows the checker 150 to then replay the instructions that executed improperly.

However, a memory dependency cannot be detected at compile time or schedule time, but can only be detected after execution. Moreover, the memory dependency cannot be detected by scoreboard 140, which tracks register data dependencies. For example, a hidden memory dependency may exist such that it causes a second instruction to be dependent upon a first instruction. The dependency exists through the memory and cannot be detected by the scoreboard 140. If the first instruction executes improperly (e.g., based on a register data dependency or external replay condition), the checker 150 will correctly detect this and will replay the first instruction. Because the second instruction is dependent upon the first instruction, the second instruction should also be replayed. However, because a memory dependency is hidden, scoreboard 140 will not detect a data dependency between the first and second instructions. Therefore, if there was no external replay event generated for the second instruction, the second instruction will not be replayed, creating an error condition.

A brief example will be used to illustrate the problem of memory dependencies. FIG. 4 is a diagram illustrating an example memory dependency according to an embodiment of the present invention. In the example of FIG. 4, a store operation (instruction 1) is followed by a load operation (instruction 2). Instruction 1 is a store from register R4 to a memory location pointed to by register R1. Instruction 2 is a load from memory location X to register R2. In this example, it is assumed that the contents of R1 should be the value X (if correctly calculated). Thus, if these instructions are correctly executed, there will be a store to location X (instruction 1), followed by a load (or read) from memory location X (instruction 2). Thus, instruction 2 is dependent upon the correct execution of instruction 1, through memory. Therefore, due to this memory dependency, it can be seen that if instruction 1 executes improperly and must be replayed, then instruction 2 must also be replayed. This is an example of a memory dependency because the dependency occurs through memory (e.g., a store and then a load to the same memory location X). As a result, the memory dependency is therefore typically hidden from detection by scoreboard 140 and/or checker 150.

However, in this example, it shall be assumed that instruction 1 executes improperly (due to its own register dependencies, etc.), causing the address generated in register R1 to be miscalculated as value Y instead of X (X would be the correct value in register R1).

Each time a load operation occurs, the MOB 127 checks the store buffer 143 to determine if there is a store to the same memory location (from which the load operation is reading). If there was a previous store to the same memory location indicated in the store buffer, then the data from this previous store is considered to be the correct data (or most current data) for this load instruction. In such case, there is a feed forward of the data from the earlier store operation to the load operation, and is performed by copying the data in the store buffer 143 for the store instruction to be returned as the result of the load operation.

In this example, the address contained in register R1 is miscalculated as Y (but should have been X). The second instruction is a load from memory location X. Therefore, when processing the load operation (the second instruction), the MOB 127 examines the store buffer 143 to determine if there was a store to address X (the address of the load operation, instruction 2). If the address for instruction 1 had been correctly calculated, the MOB 127 would have matched the address (X) of the two instructions and fed forward the data from the store buffer 143 to be the result of the load. However, in this instance, because the address for the store (instruction 1) was miscalculated as Y, the MOB 127 will not find any data in store buffer 143 for a store to memory location X. Because data stored to address X is not found in store buffer 143, the MOB 127 will retrieve the data from higher levels of memory as necessary. As shown in FIG. 4, in this example, it is assumed that the correct data stored at memory address X can be found in the L0 cache system 120. In this instance, because there was a L0 cache system hit, no external replay condition would be generated to checker 150.

This example hidden memory dependency creates several problems:

1) Checker 150 did not detect that this second instruction (the load operation) executed improperly because: a) the memory dependency was hidden (i.e., undetected by scoreboard 140), and b) there was a cache hit on L0 cache system 120, thus no L0 cache miss signal (external replay condition) was generated to cause checker 150 to replay the load. Thus, instruction 2 should be replayed, but this goes undetected.

2) In the event that the data of memory address X is not found in either L0 cache system 120 or L1 cache system 122, a memory read request would be issued to the external bus 102 to retrieve the data from external memory (e.g., from L2 cache system). A problem here is that this memory read request issued to the external bus 102 is erroneous because the correct data is not even available anywhere yet. Moreover, the bandwidth of external bus 102 is very limited. Thus, issuing this erroneous memory read request to the external bus 102 wastes valuable bus resources and blocks other correct bus requests from being received and processed. In the event of a L0 cache miss here, this load instruction would be replayed, thus causing repeated memory read requests to be issued to external bus 102 each time it is replayed. This situation can quickly saturate the external bus, thereby preventing other bus requests from being received. Moreover, each time data returns from the external bus 102 for one of these erroneous memory read requests the erroneous data is stored in local cache (L0 cache system 120 and L1 cache system 122). This pollutes the local cache systems by replacing good data on the local cache systems with the bad data from the erroneous read requests.

3) The load operation (instruction 2) was executed using the wrong data, and thus is in error.

Moreover, as noted above, the load operation (instruction 2) could cause a read request to be issued to external memory (if there is a local cache miss). A problem could arise if there is an erroneous read to a protected memory address. This could generate an interrupt or fault, which should be avoided.

According to an embodiment of the present invention, an interface is provided between the memory system 119 and a replay system 117 that is designed to address at least some of the problems which can occur due to hidden memory dependencies noted above.

IV. Operation of an Interface Between the Memory System and the Replay System

According to an embodiment of the present invention, an interface is provided between the memory system 119 and the replay system 117. The operation of this interface will be briefly described using an example. The memory dependency example illustrated in FIG. 4 will be used here to illustrate the operation and advantages of the memory system interface according to an example embodiment of the invention. The following description only provides an example operation of the present invention according to one embodiment. The present invention is not limited thereto.

Figure 5:
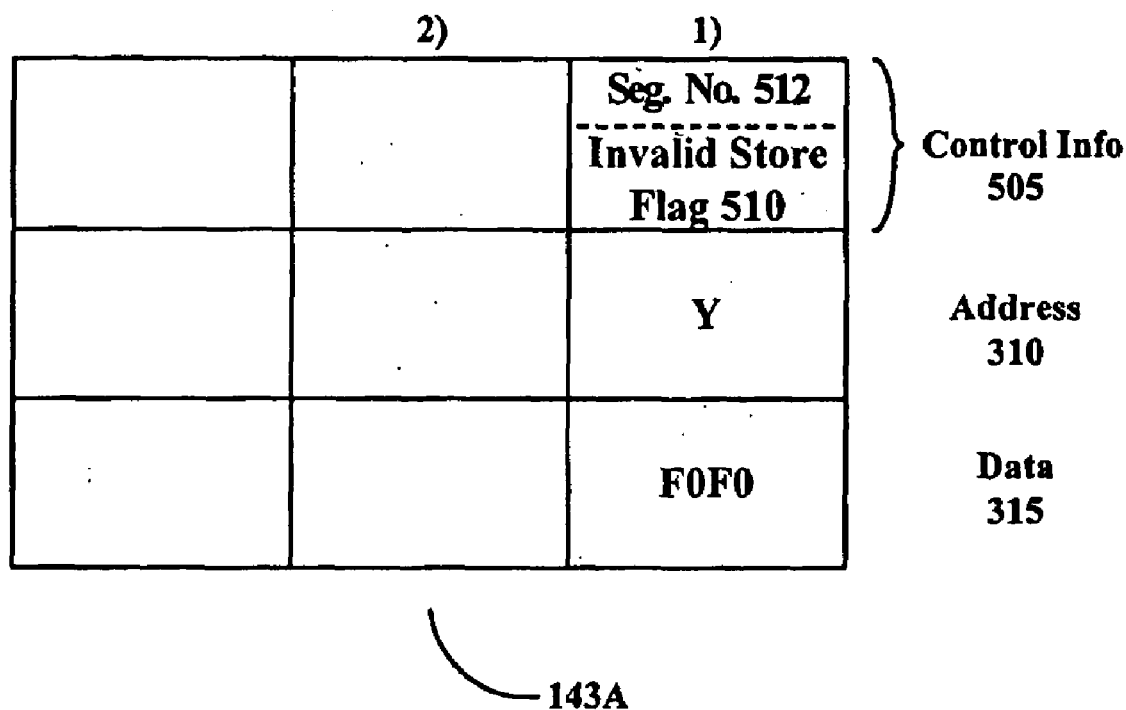
FIG. 5 is a diagram illustrating a store buffer according to another embodiment of the present invention.

FIG. 5 is a diagram illustrating a store buffer according to another embodiment of the present invention. Store buffer 143A (FIG. 5) includes several fields for each instruction, including control information 505, an address 310 and data 315. The control information 505 can include an instruction sequence number and data width or size. According to this embodiment, the control information for each store instruction in store buffer 143A includes a sequence number 512 of the instruction. The control information 505 in the store buffer 143A also includes an invalid store flag 510 which is set by MOB 127 when a store operation is detected that is invalid or incorrect (e.g., where a bad or incorrect destination address for the store is detected), as described in greater detail below.

A. The First Pass Through the Execution Unit Where the Store Instruction is Incorrectly Executed 1. The Store Instruction (Instruction 1)

Referring to FIGS. 1, 4 and 5, The store instruction (instruction 1) is dispatched to the memory system 119 and the replay system 117. The store instruction (instruction 1) is received at the memory execution unit 118 for execution. The store instruction (instruction 1) executes by storing the data (e.g., F0F0, see FIG. 5) from register R1 (the source) and the destination address (Y) to the data field 315 and the address field 310 in an entry in the store buffer 143A (FIG.

5) corresponding to instruction 1. The control information 505 for instruction 1 is also stored in stored buffer 143A. The scoreboard 140 detects that the sources (i.e., register data dependencies) and/or address for this store instruction were incorrect at execution time (which caused the address to be miscalculated as Y, instead of X). Thus, checker 150 queries scoreboard 140 and then routes instruction 1 back to mux 116 for replay because instruction 1 executed improperly.

In response to detecting that instruction 1 executed improperly (e.g., based on querying scoreboard 140) checker 150 also generates an invalid store signal 167 to both the MOB 127 and the bus queue 129 indicating that the store instruction (instruction 1) is invalid. In this case, instruction 1 is invalid because the destination address is incorrect. The store instruction (instruction 1) could also be invalid, for example, because the data to be stored (provided in R1) is incorrect.

In response to the invalid store signal 167 from checker 150, the MOB 127 sets a store invalid flag 510 in the entry corresponding to instruction 1 in store buffer 143A (indicating that this instruction is bad or incorrect and will be replayed), FIG. 5. According to an embodiment, if an invalid store flag 510 is set for one or more store instructions in the store buffer 143A, this will cause all logically subsequent (or programmatically younger) load instructions to be replayed because it is unknown whether the data or the destination address for the store instruction was incorrect. In other words, because the destination address 310 for the invalid store instruction (e.g., instruction 1 in this case) cannot be trusted, there may exist a hidden memory dependency between the invalid store instruction and any logically subsequent load instructions (subsequent in program order). As a result, according to an embodiment of the present invention, an invalid store flag that is set for any instruction in the store buffer will cause all logically subsequent load instructions (e.g., having a sequence number greater than the store) to be replayed.

Figure 7:
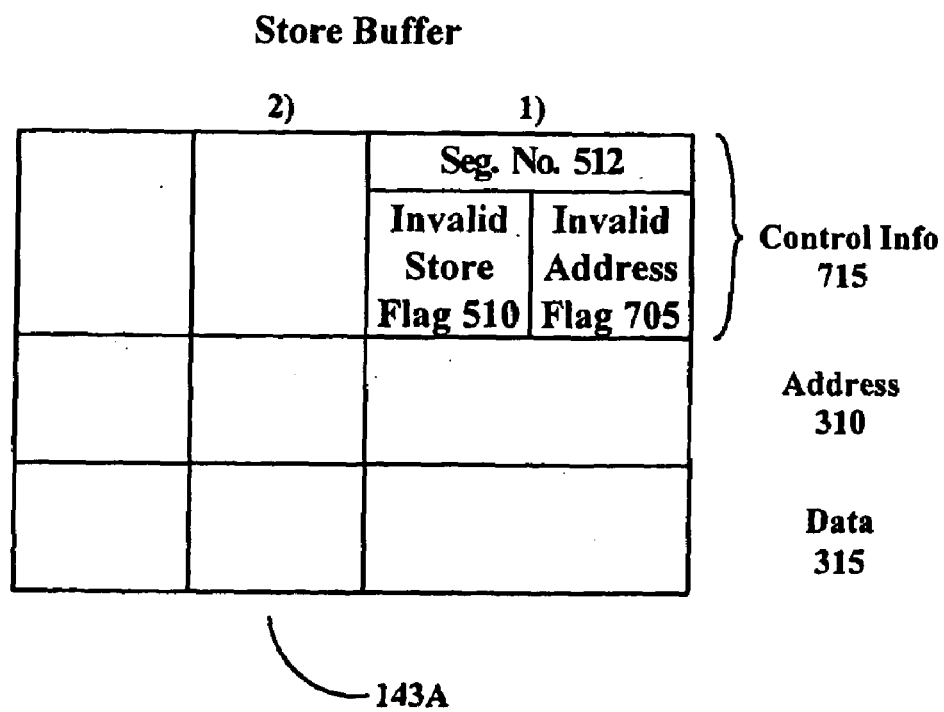
FIG. 7 is a diagram illustrating a store buffer according to yet another embodiment of the present invention.

In an alternate embodiment, the checker 150 can indicate not only that a store is invalid (e.g., using an invalid store signal 167), but also indicates whether the invalid store was caused from an incorrect (or invalid) address or incorrect data. According to an example implementation, the checker 150 asserts an "invalid address" signal (or a bad address signal) to MOB 127 if the invalid store is caused by an invalid address. The invalid address signal will remain clear or unasserted unless the store is invalid and was caused by an invalid address. FIG. 7 is a block diagram of a store buffer according to another embodiment. Referring to FIG. 7, the MOB 127 sets an invalid address flag 705 if the checker asserted the invalid address signal. According to this alternative embodiment, if an invalid address flag 705 is set and an invalid store flag 510 is set for an instruction in the store buffer 143A (indicating that the invalid store was caused by an incorrect address), this will cause all logically subsequent (or programmatically younger) load instructions to be replayed. If an invalid store flag 510 is set but the invalid address flag is cleared or unasserted (indicating that the invalid store was caused by incorrect or invalid data), logically subsequent load instructions matching the address of this store instruction will be replayed. Thus, in this embodiment, where there is an invalid store, it is necessary to replay only those programmatically subsequent loads having an address which matches the address of the store if the invalid store is caused by invalid data (indicating that the store address is correct).

Figure 6:
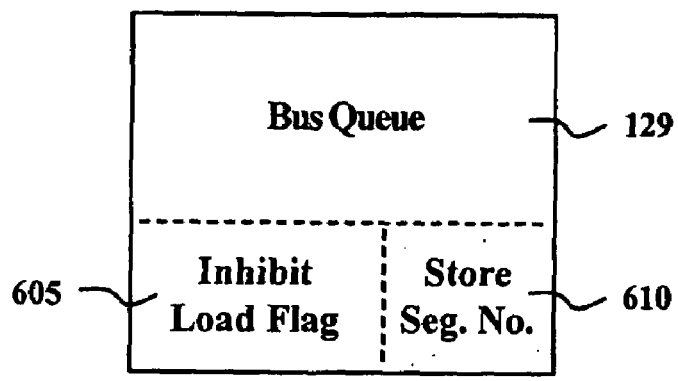
FIG. 6 is a diagram illustrating a bus queue according to an embodiment of the present invention.

As noted above, for each load instruction, if the data cannot be found locally, bus queue 129 will issue a memory read request to external bus 102. These memory read requests should be prevented for subsequent load instructions after detection of an invalid store because these read requests are erroneous. Therefore, the invalid store signal 167 generated by checker 150 is also input to bus queue 129. FIG. 6 is a diagram illustrating a bus queue according to an embodiment of the present invention. The bus queue 129 of FIG. 6 includes an inhibit load flag 605 and a store sequence number 610. The bus queue 129 will set the inhibit load flag 605 in response to receiving the invalid store signal 167, and will store the sequence number of the invalid store instruction in the store sequence number. While the inhibit load flag 605 is set, memory read requests for subsequent (younger programmatically) load instructions will be inhibited. For example, the bus queue will not send out memory requests for instructions (i.e., loads) having a sequence number that is greater than the invalid store sequence number, shown in field 610. In this manner, the present invention avoids wasting valuable bus resources on erroneous memory requests.

2. The Load Instruction (Instruction 2)

The load instruction (instruction 2) is dispatched to memory system 119 and replay system 117. To execute this load instruction, the MOB 127 obtains the most current (or correct) data for this load and stores this data, the source memory address and control information in an entry in the load buffer 141 corresponding to this load instruction. To obtain the most current data (or correct data) for this instruction, the MOB 127 compares the source address (X) of this load to the destination addresses in the store buffer 143A (FIG. 5) to determine if there was a store to the same address (address X) by a previous store instruction. According to an embodiment, MOB 127 identifies earlier (or programmatically older) store instructions than the load instruction by comparing the sequence number of the load (field 322, FIG. 3) to the sequence number (field 512, FIG. 5) of each store instruction in the store buffer 143A. Earlier (or programmatically older) instructions will have a sequence number that is smaller than the load instruction.

If there is a programmatically older store instruction in store buffer 143A that has a destination address 310 (FIG. 5) that matches the source address 325 (FIG. 3) of the load instruction (instruction 2), then the data from the store buffer 143A for the older store is fed forward and returned as the result for the load (instruction 2). If there was more than one older store instruction in the store buffer 143A that stored data to the same address as the load, the data of the most current store is used. The address 325 and control information 320 for the load (instruction 2) are also stored in the load buffer 141 for the entry for instruction 2. If there is no older store instruction in store buffer 143A which stored data to the same memory address used as a source address by the load instruction, then the MOB 127 will attempt to retrieve the data from successively higher levels of memory until the data is obtained, including from L0 cache system 120, L1 cache system 122, L2 cache system 106, main memory 104 and disk memory 105, respectively.

Next, the MOB 127 determines whether the load instruction should be replayed by examining all entries in store buffer 143A to determine if there is at least one store instruction in the store buffer 143A that is older than this load instruction and has its invalid store flag 510 set. If at least one older store instruction is found in store buffer 143A that has its invalid store flag 510 (FIG. 5) set, this indicates that there may be a hidden memory dependency between the load instruction and the store instruction (regardless whether or not the load address matches the store address). This is because the address in the store instruction may have been incorrectly calculated (as shown in the example memory dependency of FIG. 4), and therefore, cannot be trusted. In this example, the MOB 127 detects that the invalid store flag 510 is set for instruction 1 in store buffer 143A This indicates that all subsequent loads (i.e., having a greater sequence number than the store) should be replayed.

Therefore, the MOB 127 generates an external replay signal 145 to checker 150 indicating that an external replay condition has been detected by MOB 127 for this instruction. This external replay signal 145 causes checker 150 to correctly route the load instruction 2 back to mux 116 for replay. The MOB 127 generates the external replay signal 145 for each subsequent (programmatically younger) load instruction so long as an invalid store flag is set for one or more store instructions in store buffer 143A. This causes all subsequent loads to be replayed (if there is at least one invalid flag 510 in the store buffer 143A that is set).

B. The First Pass Through the Execution Unit Where the Instruction is Correctly Executed 1. The Store Instruction (Instruction 1)

Next, the store instruction (instruction 1) is received again at memory system 119 for re-execution and at replay system 117. On this (second) iteration through execution unit 118, it will be assumed that the instruction 1 executes properly (e.g., the destination memory address is calculated correctly as address X). The store instruction (instruction 1) is executed by storing the data (e.g., F0F0, see FIG. 5) from register R1 (the source) and the correct destination address (X) to the data field 315 and the address field 310 in an entry in the store buffer 143A (FIG. 5) corresponding to instruction 1. The control information is also stored. Thus, on this second iteration or attempt, instruction 1 generates the proper destination address (X). Because there are no data dependencies or external replay conditions for instruction 1 on this iteration, the checker 150 does not generate (assert) the invalid store signal 167. In response to the unasserted or cleared invalid store signal 167 from checker 150, the MOB 127 clears the invalid store flag 510 in store buffer 143A (FIG. 5) for instruction 1. Also, in response to the unasserted or cleared invalid store signal 167, the bus queue 129 clears the inhibit load flag 605 in the bus queue 129 (FIG. 6). Also, because the load instruction (instruction 1) is considered replay safe by checker 150, the load instruction may be retired in program order by retirement unit 152.

2. The Load Instruction (Instruction 2)

When instruction 2 is re-executed (or replayed) by memory execution unit 118, the MOB 127 stores the source memory address and control information in an entry in the load buffer 141 corresponding to this load instruction. On this second iteration, the source address 325 of the load instruction matches the destination address 310 (X in this case) and the MOB 127 detects that this store is older than the current load instruction (e.g., based on sequence numbers). This indicates that the most current or correct data for the load is in the instruction 1 entry of store buffer 143A. Therefore, the data from the store buffer 143A for instruction 1 is fed forward to be the load result for instruction 2. Also, because the inhibit load flag 605 has now been cleared, the bus queue will be permitted to send memory requests for this load and subsequent loads to external bus 102, as necessary (i.e., in the event that the data is not found in any local cache).

Next, the MOB 127 determines whether or not this load must be replayed by examining all entries in store buffer 143A to determine if there is at least one store instruction in the store buffer 143A that is older than this load instruction and has its invalid store flag 510 set. In this second iteration, the MOB 127 examines all entries in the store buffer, but does not find any older store instructions in which their invalid store flag 510 has been set (the invalid store flag 510 for instruction 1 was just cleared). MOB 127 therefore will not generate an external replay signal 145 to checker 150 for this load instruction (on the second iteration through execution unit 118). Thus, assuming no other replay conditions or register dependencies exist for this load instruction (instruction 2), the load instruction will be sent to retirement unit 152 for retirement in program order because the load instruction will be deemed replay safe by checker 150. According to one embodiment, the retirement process for the load instruction (instruction 2) includes copying the data from the load buffer into the destination register.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A processor comprising:
a replay system to determine one or more instructions that have not executed properly and to replay the instructions that have not executed properly, said replay system to set an invalid store flag in a storage area if a store instruction has not executed properly;
a memory execution unit coupled to the replay system to execute load and store instructions, wherein if the invalid store flag is set for a store instruction, the replay system is to replay a load instruction that is later in sequence than the invalid store instruction.

2. The processor of claim 1 wherein said replay system is to clear said invalid store flag if the store instruction has executed properly.

3. The processor of claim 2 wherein said memory execution unit is to replay a plurality of load instructions that are later in sequence than the invalid store instruction while the invalid store flag is set.

4. The processor of claim 3 wherein the memory execution unit comprises a memory ordering buffer to maintain an ordering of load and store instructions and a bus queue to handle bus requests to an external bus.

5. The processor of claim 3 wherein said replay system comprises a checker to determine whether an instruction has executed properly.

6. A processor comprising:
a replay system to determine one or more instructions have not executed properly and to replay the instructions that have not executed properly;
a memory execution unit coupled to the replay system to execute load and store instructions, the memory execution unit including a store buffer including one or more entries for storing information related to store instructions, each entry in the store buffer including an invalid store flag to indicate whether one of said store instructions has executed properly; and
at least one signal line coupled between said replay system and said memory execution unit, said signal line to transmit an external replay signal that is to be generated from the memory execution unit to the replay system if an invalid store flag is set for a store instruction in the store buffer.

7. The processor of claim 6 wherein the external replay signal is to be generated for each load instruction that is later in programming sequence than the invalid store instruction, and the replay system is to replay each later in programming sequence load instructions.

8. The processor of claim 7 wherein the replay system is to generate an invalid store signal to the memory execution unit over said at least one signal line if the replay system detects that a store instruction has executed improperly, and the memory execution unit is to the set the invalid store flag for the store instruction in response to the invalid store signal.

9. The processor of claim 7 wherein the memory execution unit further comprises a bus queue coupled to the store buffer to issue and track memory requests that are sent to an external bus.

10. The processor of claim 9 wherein if there is a store instruction that did not execute properly, the bus queue is to inhibit memory requests to an external bus for load instructions later in programming sequence than the store instruction until the store instruction executes properly.

11. A processor comprising:
a replay system to determine one or more instructions that have not executed properly and replaying the instructions that have not executed properly; and
a memory execution unit coupled to the replay system to execute load and store instructions, the memory execution unit including a bus queue to issue and track memory requests to an external bus, the bus queue to be notified by the replay system if a store instruction executes improperly, the bus queue to inhibit memory requests to the external bus for load instructions that are programmatically later in sequence than the store instruction that executed improperly.

12. The processor of claim 11 wherein said bus queue is to inhibit said memory requests until the store instruction executes properly.

13. The processor of claim 12 wherein the replay system is to generate an invalid store signal to the bus queue in response to detecting that a store instruction has executed improperly.

14. The processor of claim 13 wherein the bus queue includes a storage area for an inhibit load flag and the bus queue is to set said inhibit load flag if the bus queue receives the invalid store signal; said bus queue further includes a storage area for a sequence number field to store the sequence number of the store instruction that has executed improperly; said bus queue to inhibit memory requests for later-in-sequence load instructions if the invalid load flag is set.

15. A processor comprising:
a replay system to determine one ore more instructions that have not executed properly and to replay those instructions that have not executed properly;
a memory execution unit coupled to the replay system to execute load and store instructions, the memory execution unit including an invalid address flag to indicate whether a store instruction has not executed properly due to an invalid address; wherein if an invalid address flag is set for a store instruction, the replay system is to replay a load instruction having an address matching the address of the invalid store instruction and that is programmatically later in sequence than the invalid store instruction.

16. The processor of claim 15 wherein said replay system is to replay a plurality of load instructions having an address matching the address of the invalid store instruction that is programmatically later in sequence than the invalid store instruction while said invalid address flag is set.

17. The processor of claim 16 wherein the memory execution unit includes a storage area for an invalid store flag to indicate if a store instruction has not execute properly and an invalid address flag to indicate whether a store instruction executed improperly due to an invalid data or an invalid address.

18. A system comprising:
a memory to store a plurality of instructions;
a processor coupled to said memory and to execute said plurality of instructions; said processor including
a replay system to determine one or more instructions that have not executed properly and to replay the instructions that have not executed properly, said replay system to set an invalid store flag in a storage area if a store instruction has not executed properly;
a memory execution unit coupled to the replay system to execute load and store instructions, wherein if the invalid store flag is set for a store instruction, the replay system is to replay a load instruction that is later in sequence than the invalid store instruction.

19. The system of claim 18 wherein said replay system is to clear said invalid store flag if the store instruction has executed properly.

20. The system of claim 19 wherein said memory execution unit replay system is to replay a plurality of load instructions that are later in sequence than the invalid store instruction while the invalid store flag is set.

21. A system comprising:
a memory to store a plurality of instructions;
a processor coupled to said memory and to execute said plurality of instructions; said processor including
a replay system to determine one or more instructions that have not executed properly and to replay the instructions that have not executed properly;
a memory execution unit coupled to the replay system to execute load and store instructions, the memory execution unit including a store buffer including one or more entries for storing information related to store instructions, each entry in the store buffer including an invalid store flag to indicate whether one of said store instructions has executed properly; and
at least one signal line coupled between said replay system and said memory execution unit, said signal line to transmit an external replay signal that is to be generated from the memory execution unit to the replay system if an invalid store flag is set for a store instruction in the store buffer.

22. The system of claim 21 wherein the external replay signal is to be generated for each load instruction that is later in programming sequence than the invalid store instruction, and the replay system is to replay each later in programming sequence load instructions.

23. The system of claim 22 wherein the replay system is to generate an invalid store signal to the memory execution unit over said at least one signal line if the replay system detects that a store instruction has executed improperly, and the memory execution unit is to the set the invalid store flag for the store instruction in response to the invalid store signal.

24. The system of claim 23 wherein the memory execution unit further comprises a bus queue coupled to the store buffer to issue and track memory requests that are sent to an external bus.

25. The system of claim 24 wherein if there is a store instruction that did not execute properly, the bus queue is to inhibit memory requests to an external bus for load instructions later in programming sequence than the store instruction until the store instruction executes properly.

* * * * *

UNITED STATES PATENT AND TRADEMARK OFFICE
CERTIFICATE OF CORRECTION

PATENT NO. : 7,089,409 B2  Page 1 of 1
APPLICATION NO. : 10/690634
DATED : August 8, 2006
INVENTOR(S) : Merchant et al.

It is certified that error appears in the above-identified patent and that said Letters Patent is hereby corrected as shown below:

| Column | Line | |
|---|---|---|
| 16 | 23-24 | Delete " memory execution unit". |

Signed and Sealed this

Twentieth Day of February, 2007

JON W. DUDAS
*Director of the United States Patent and Trademark Office*